US008091875B2

(12) United States Patent
Yoshioka et al.

(10) Patent No.: US 8,091,875 B2
(45) Date of Patent: Jan. 10, 2012

(54) GRIPPING JIG FOR ASSEMBLING, ASSEMBLING DEVICE, AND PRODUCING METHOD OF ASSEMBLED BODY

(75) Inventors: Kunihiko Yoshioka, Nagoya (JP); Kazuhi Matsumoto, Nagoya (JP); Koji Kimura, Nagoya (JP); Shinya Yoshida, Nagoya (JP); Takashi Ota, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/649,476

(22) Filed: Dec. 30, 2009

(65) Prior Publication Data

US 2010/0095501 A1 Apr. 22, 2010

Related U.S. Application Data

(62) Division of application No. 11/867,035, filed on Oct. 4, 2007, now Pat. No. 7,699,299.

(60) Provisional application No. 60/828,241, filed on Oct. 5, 2006, provisional application No. 60/828,413, filed on Oct. 6, 2006.

(51) Int. Cl.

| | |
|---|---|
| ***B25B 1/24*** | (2006.01) |
| ***B25B 5/16*** | (2006.01) |
| ***B25B 1/14*** | (2006.01) |
| ***B25B 1/02*** | (2006.01) |
| ***B25B 5/02*** | (2006.01) |
| ***B25B 5/14*** | (2006.01) |
| ***B25B 13/16*** | (2006.01) |
| *B23Q 3/00* | (2006.01) |

(52) U.S. Cl. .......... 269/266; 269/228; 269/209; 269/43; 81/170

(58) Field of Classification Search .................. 269/266, 269/43, 228, 203, 209, 168, 37; 81/170
See application file for complete search history.

(56) References Cited

U.S. PATENT DOCUMENTS 288,035 A * 11/1883 Dixon .......................... 269/104

(Continued)

FOREIGN PATENT DOCUMENTS

JP 60-145971 A1 8/1985

(Continued)

OTHER PUBLICATIONS

Herlinger, Jim et al., "*Optimizing Green Machining*," Feb. 2, 2006, www.ceramicindustry.com, pp. 1-4.

*Primary Examiner* — Alvin J. Grant
(74) *Attorney, Agent, or Firm* — Burr & Brown

(57) ABSTRACT

A gripping jig for assembling whereby a force is applied to a molded body in a direction perpendicular to an assembling direction. When an assembling load is applied to the molded body, the force is adjustable with an adjustment screw such that the molded body is guided to move in the assembling direction. Since the force is applied from a direction different from the assembling direction, the molded body can move in the assembling direction, and since the force is adjustable, application of the assembling load to the molded body and the movement of the molded body can be adjusted. Since a plurality of the molded bodies are fixed and assembled respectively, when there are variations in size of the molded bodies, an excessive assembling load is is avoided with each molded body guided to move, so that a more uniform assembling load is applied to the plurality of molded bodies.

14 Claims, 9 Drawing Sheets

U.S. PATENT DOCUMENTS

| | | | | | |
|---|---|---|---|---|---|
| 356,937 | A | * | 2/1887 | Harding | 269/9 |
| 1,323,127 | A | * | 11/1919 | Treuthardt | 269/45 |
| 1,393,083 | A | * | 10/1921 | Campbell | 269/97 |
| 2,228,593 | A | * | 1/1941 | Dibble et al. | 224/42.31 |
| 2,636,527 | A | * | 4/1953 | Schiemann | 269/45 |
| 2,836,139 | A | * | 5/1958 | Holmberg | 269/45 |
| 3,024,018 | A | * | 3/1962 | Manz | 248/349.1 |
| 3,718,327 | A | * | 2/1973 | Nunez | 269/37 |
| 3,788,632 | A | * | 1/1974 | Lukas | 269/20 |
| 3,982,739 | A | * | 9/1976 | Maes | 269/37 |
| 4,089,513 | A | * | 5/1978 | Mack | 269/96 |
| 4,367,594 | A | * | 1/1983 | Murray, Jr. | 33/661 |
| 4,378,937 | A | * | 4/1983 | Dearman | 269/6 |
| 4,825,513 | A | * | 5/1989 | Verespej | 24/135 N |
| 4,853,053 | A | * | 8/1989 | Minjolle et al. | 156/73.5 |
| 5,924,685 | A | * | 7/1999 | Webb | 269/228 |
| 5,926,882 | A | * | 7/1999 | Veith et al. | 5/658 |
| 6,039,313 | A | * | 3/2000 | Baculy | 269/168 |
| 6,167,607 | B1 | * | 1/2001 | Pryor | 29/407.04 |
| 6,196,536 | B1 | * | 3/2001 | Hintze | 269/282 |
| 6,199,255 | B1 | * | 3/2001 | Wang et al. | 29/239 |
| 6,257,101 | B1 | * | 7/2001 | Marlette et al. | 81/165 |
| 6,620,272 | B2 | | 9/2003 | Zaslavsky et al. | |
| 6,776,403 | B1 | * | 8/2004 | Neufeld | 269/6 |
| 2005/0215167 | A1 | | 9/2005 | Neil et al. | |

FOREIGN PATENT DOCUMENTS

| | | | |
|---|---|---|---|
| JP | 04-344876 | A1 | 12/1992 |
| JP | 06-262369 | A1 | 9/1994 |
| JP | 2004-519820 | A1 | 7/2004 |
| WO | 02/068166 | A2 | 9/2002 |

* cited by examiner (a)

(b)

GRIPPING JIG FOR ASSEMBLING, ASSEMBLING DEVICE, AND PRODUCING METHOD OF ASSEMBLED BODY

CROSS REFERENCE TO RELATED APPLICATIONS

This is a divisional application of U.S. application Ser. No. 11/867,035 filed Oct. 4, 2007, which claims the benefit of U.S. Provisional Application 60/828,241 filed Oct. 5, 2006 and U.S. Provisional Application 60/828,413, filed Oct. 6, 2006, the entireties of which are incorporated herein by reference

BACKGROUND OF THE INVENTION

1. Field of the Invention

The present invention relates to a gripping jig for assembling, an assembling device, and a producing method of an assembled body.

2. Description of the Related Art

A gripping jig for assembling has been proposed in which a component member of a ceramic luminous body is set in an electrode reception area so as to fix the component member with a pin (see Patent Document 1, for example). In the gripping jig for assembling described in Patent Document 1, two component members fixed to the electrode reception member are prepared; junctions of the component members are opposed to each other; the junctions are abutted to each other while being simultaneously heated for locally melting a cementing material, so that the junctions are joined together by alternately compressing and extending the boundary region between the two junctions.

[Patent Document 1] PCT Japanese Translation Patent Publication No. 2004-519820

SUMMARY OF THE INVENTION

However, in the gripping jig for assembling described in Patent Document 1, since the component members are moved closer to and apart from each other when compressing and extending the junctions, the component member must be strongly fixed to the electrode reception member, so that a load larger than the value expected prior to the assembling may be applied to the component member. When the gripping jig for assembling is provided with a plurality of electrode reception members so as to fix a plurality of component members thereto, for example, if the component members have variations in size in the assembling direction, a problem arises in which variations in applied load are produced. For solving this problem, the melting region in the junction boundary must be increased, so that it has been difficult to unify the thicknesses of junction portions. When a cementing material is used, the cementing material must be applied to the junction portion with a thickness more than necessary, which has also made it difficult to unify the thicknesses of junction portions.

The present invention has been made in view of such problems, and it is an object of the present invention to provide a gripping jig for assembling, an assembling device, and a producing method of an assembled body capable of suppressing the application of a load exceeding a predetermined assembling load to a member for assembling. Also, it is another object of the present invention to provide a gripping jig for assembling, an assembling device, and a producing method of an assembled body capable of applying a more uniform assembling load to a plurality of entire members for assembling. Also, it is another object of the present invention to provide a gripping jig for assembling, an assembling device, and a producing method of an assembled body capable of suppressing the presence of a member for assembling, to which a predetermined assembling load would not be applied. It is another object of the present invention to provide a gripping jig for assembling, an assembling device, and a producing method of an assembled body capable of minimizing the amount of a cementing material for assembling members for assembling.

The present invention has made the following means for achieving at least one of the above-mentioned objects.

A gripping jig for assembling according to the present invention is a gripping jig for assembling a plurality of members for assembling and includes a movement unit for guiding a member for assembling in a predetermined assembling direction; a fixing-force applying unit capable of fixing the member for assembling by applying a fixing force to the member for assembling in a direction different from the assembling direction of the member for assembling; and an adjusting unit for adjusting the fixing force applied by the fixing-force applying unit so that the member for assembling is guided by the movement unit to move when a predetermined assembling load or more is applied to the member for assembling.

In the gripping jig for assembling, the fixing force is applied from a direction different from the assembling direction of the member for assembling, and when a predetermined assembling load or more is applied to the member for assembling, the fixing force is adjustable such that the member for assembling is guided to move in the assembling direction. Since the fixing force is applied from a direction different from the assembling direction in such a manner, the member for assembling can move in the assembling direction, and as the fixing force is adjustable, the application of the assembling load to the member for assembling and the movement of the member for assembling can be adjusted. Hence, the application of a load over a predetermined assembling load to the member for assembling can be suppressed.

The gripping jig for assembling according to the present invention may further include an abutment unit for applying an assembling load to the member for assembling by abutting the member for assembling. By doing so, when the abutment unit abuts the member for assembling, an assembling load over a predetermined assembling load can be applied to the member for assembling.

In the gripping jig for assembling according to the present invention, preferably, a plurality of the movement units are provided and the fixing-force applying unit is provided for each of the plurality of the movement units. By doing so, when there are variations in size of the members for assembling, if an assembling load over a predetermined assembling load is applied, each member for assembling is guided by the movement unit to move, so that the presence of a member for assembling, to which a desired assembling load would not be applied, can be suppressed, so that more uniform assembling load can be applied to a plurality of the entire members for assembling. Thus, when the members for assembling are joined to each other with a cementing material, the amount of the cementing material for joining the members for assembling can be reduced.

In the gripping jig for assembling according to the present invention, the fixing-force applying unit may apply the fixing force to the member for assembling in a direction perpendicular to the assembling direction. By doing so, the sufficient fixing force can be applied to the member for assembling as well as when the assembling load is applied to the member for assembling, the slippage is produced so that the member for assembling may be easily moved.

In the gripping jig for assembling according to the present invention, the fixing-force applying unit may include a pushing unit for pushing part of the member for assembling so as to apply the fixing force to the member for assembling and a positioning unit for positioning the member for assembling pushed by the pushing unit in the assembling direction. At this time, the fixing-force applying unit may also include the pushing unit formed of an elastic body. By doing so, the pushing unit is formed of a deformable elastic body, so that the member for assembling can be fixed in a more protected state. The "elastic body" herein includes rubber, a spring, a sponge, and felt, for example. At this time, the fixing-force applying unit may also include the pushing unit formed of a hollow member. By doing so, the pushing unit is more deformed along with the application of the fixing force so as to softly fix the member for assembling, so that the member for assembling can be fixed in a further protected state. The fixing-force applying unit may include a sliding unit for moving the pushing unit toward the member for assembling, and the adjusting unit may also be an adjustment screw capable of adjusting the fixing force by changing the position of the sliding unit. By doing so, the member for assembling can be fixed with a comparatively simple structure that moves the sliding unit with the adjustment screw. In addition, the adjusting unit may also be cam capable of adjusting the fixing force by changing the position of the sliding unit. Alternatively, the fixing-force applying unit may apply the fixing force to the member for assembling by pressurizing the inside of the pushing unit formed of the hollow member so as to inflate the pushing unit, and the adjusting unit may adjust the pressure to the pushing unit. By doing so, the member for assembling can be fixed with a comparatively simple mechanism that inflates the hollow member.

In the gripping jig for assembling according to the present invention, the fixing-force applying unit may include a pulling-in unit for attracting part of the member for assembly so as to apply the fixing force to the member for assembling and a positioning unit for positioning the member for assembling pulled by the pulling-in unit in the assembling direction.

In the gripping jig for assembling according to the present invention adopting the embodiment including the positioning unit, preferably, the member for assembling includes a gripping part which is gripped with the fixing-force force applying unit and is formed to have a gripping width within a predetermined parallel range, and the movement unit is a through-hole for guiding the gripping part to move in the assembling direction and the positioning unit included in the fixing-force applying unit is formed on part of the inner wall of the through-hole. By doing so, the gripping part having the gripping width formed within a predetermined parallel range is gripped, so that the member for assembling may be easily guided with the through-hole 27. Since the positioning unit uses the inner wall of the through-hole, no additional specific structure is required for positioning the member for assembling. The "gripping width within a predetermined parallel range" is herein a range movable in the assembling direction without the deformation or destruction of the member for assembling even when the member for assembling gripped with the gripping part is pressed from the assembling direction, that is, the range exhibiting a substantially constant gripping width may also be empirically established. At this time, the member for assembling may be formed of a body and a cylindrical part as the gripping part with an outer diameter smaller than that of the body. By doing so, the member for assembling may be movably fixed with the cylindrical part.

In the gripping jig for assembling according to the present invention, the member for assembling may be a brittle material made of a green ceramic raw material. Brittle members may be deformed or destructed when an excessive load is applied, so that they need to be movable for avoiding this when an assembling load is applied, so that the incorporation of the present invention is significant. Also, in the gripping jig for assembling according to the present invention, the member for assembling may be any one of a luminous-tube molded body for a metal halide and a luminous-tube molded body for a high-pressure sodium vapor lamp, which are made of a green ceramic raw material. These molded bodies may be brittle, so that they need to be movable when an assembling load is applied, so that the incorporation of the present invention is significant.

An assembling device according to the present invention includes a first mounting unit for mounting the first gripping jig for assembling of any one described above so that a joining part of the member for assembling fixed to the first gripping jig for assembling moves in a predetermined direction; a second mounting unit for mounting the second gripping jig for assembling of any one described above so that a joining part of the member for assembling fixed to the second gripping jig for assembling is opposed to the joining part of the member for assembling fixed to the first gripping jig for assembling; and a moving-assembling unit for guiding at least one of the first gripping jig for assembling and the second gripping jig for assembling so that the joining part of the first gripping jig for assembling mounted on the first mounting unit abuts the joining part of the second gripping jig for assembling mounted on the second mounting unit.

On this assembling device, the gripping jigs for assembling of any ones described above are mounted so that joining parts of members for assembling are opposed to each other, and the joining parts are joined together by guiding at least one of the gripping jigs for assembling. Since the gripping jig for assembling according to the present invention can suppress a load over a predetermined assembling load from being applied to a member for assembling, the assembling device having the gripping jigs for assembling mounted thereon may also have the same effect. In addition, when the gripping jig for assembling of any one described above is adopted, the device may have the effect corresponding to any one of those described above.

In the assembling device according to the present invention, preferably, the first mounting unit mounts the first gripping jig for assembling so that the joining part is upward directed in the vertical direction as the predetermined direction, and the second mounting unit mounts the second gripping jig for assembling so that the joining part is downward directed in the vertical direction, and the moving-assembling unit guides the second gripping jig for assembling mounted on the second mounting unit toward the first gripping jig for assembling mounted on the first mounting unit. By doing so, the second gripping jig is downward guided in the vertical direction, so that the first gripping jig for assembling can comparatively easily abut the second gripping jig for assembling. Also, the members for assembling can be assembled using self-weights of the second gripping jig for assembling and the second mounting unit.

A producing method of an assembled body made by assembling a plurality of members for assembling using a gripping jig for assembling, the gripping jig including: a movement unit for guiding the members for assembling in a predetermined assembling direction; a fixing-force applying unit capable of fixing the member for assembling by applying a fixing force to the member for assembling from a direction different from the assembling direction of the member for assembling; and an adjusting unit for adjusting the fixing force applied by the fixing-force applying unit so that the member for assembling is guided by the movement unit to move when a predetermined assembling load or more is applied to the member for assembling. The producing method according to the present invention includes: a fixing step of fixing, with the fixing-force applying unit, the member for assembling to the gripping jig for assembling by applying a fixing force adjusted by the adjusting unit so that the member for assembling is guided by the movement unit to move when a predetermined assembling load or more is applied to the member for assembling; an applying step of applying a cementing material on a joining part of the fixed member for assembling; and an assembling step of placing a plurality of the gripping jig, which have the member for assembling respectively fixed thereon, to be opposed to each other, and joining the members for assembling together so as to obtain an assembled body.

In the producing method of an assembled body, when a predetermined or more assembling load is applied to a member for assembling, the fixing force, adjusted so that the member for assembling is guided with the movement unit to move, is applied from a direction different from the assembling direction so as to fix the member for assembling to the gripping jig for assembling; the cementing material is applied to the joining part of the member for assembling fixed; and a plurality of the gripping jigs for assembling having the members for assembling fixed thereto are made opposed to each other for assembling the members for assembling together. In such a manner, since the fixing force is applied from a direction different from the assembling direction, the member for assembling is movable in the assembling direction and the fixing force is adjustable, so that the application of the assembling load to the member for assembling and the movement of the member for assembling are adjustable. Accordingly, a load over a predetermined assembling load can be suppressed from being applied to the member for assembling. At this time, the gripping jig for assembling includes an abutment unit for applying the assembling load to the member for assembling by abutting the member for assembling. In the fixing process, by applying the fixing force with the fixing-force applying unit, while the member for assembling not being in contact with the abutment unit, the member for assembling may also be fixed to the gripping jig for assembling. By doing so, a load over a predetermined assembling load can be more securely suppressed from being applied to the member for assembling. In addition, the producing method of an assembled body may adopt various embodiments of the gripping jig for assembling described above, and a process may be added for achieving various functions of the gripping jig for assembling described above.

In the producing method of an assembled body according to the present invention, preferably, a plurality of the movement units are provided in the gripping jig for assembling; the abutment unit is provided for each of the movement units; and the fixing-force applying unit is provided for each of the plurality of the movement units and for each of the plurality of the abutment units; and the fixing process arranges the member for assembling at each of the plurality of the movement units, and fixes the members for assembling with the fixing-force applying units in a state that the joining parts of the members are aligned with a predetermined plane. By doing so, a plurality of the members for assembling are assembled while they are aligned with a predetermined plane, so that the more uniform assembling load can be applied to a plurality of the entire members for assembling.

The producing method of an assembled body according to the present invention may further include a sintering step of sintering the assembled body assembled.

BRIEF DESCRIPTION OF THE DRAWINGS

FIG. 2(*b*) is a sectional view at the line B-B of FIG. 2(*a*); and FIG. 2(*c*) is a plan view of the gripping jig 20 for assembling and fixing a plurality of the molded bodies 50 thereto.

FIG. 3(*b*) is a sectional view at the line C-C of FIG. 3(*a*); FIG. 3 (*c*) is a plan view of the slider 30 for fixing a plurality of the molded bodies 50 thereto.

DETAILED DESCRIPTION OF THE INVENTION

Figure 1:
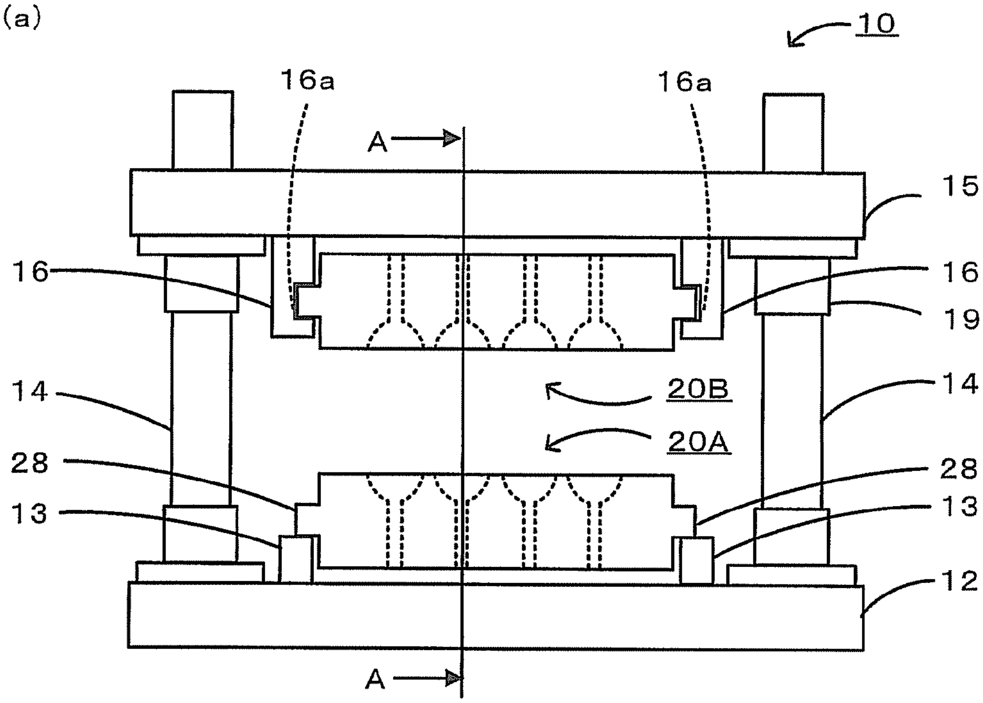
FIG. 1 is a schematic structural view of an assembling device 10 for assembling molded bodies 50, in which FIG. 1(*a*) is a front view and FIG. 1(*b*) is a sectional view at the line A-A of FIG. 1(*a*).
Figure 1:
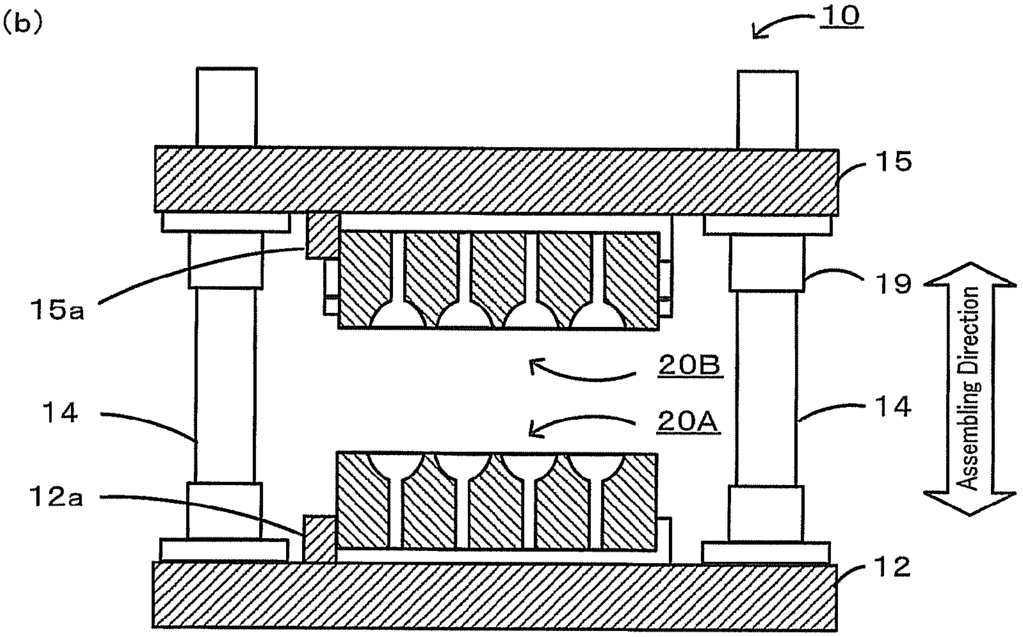
Figure 2:
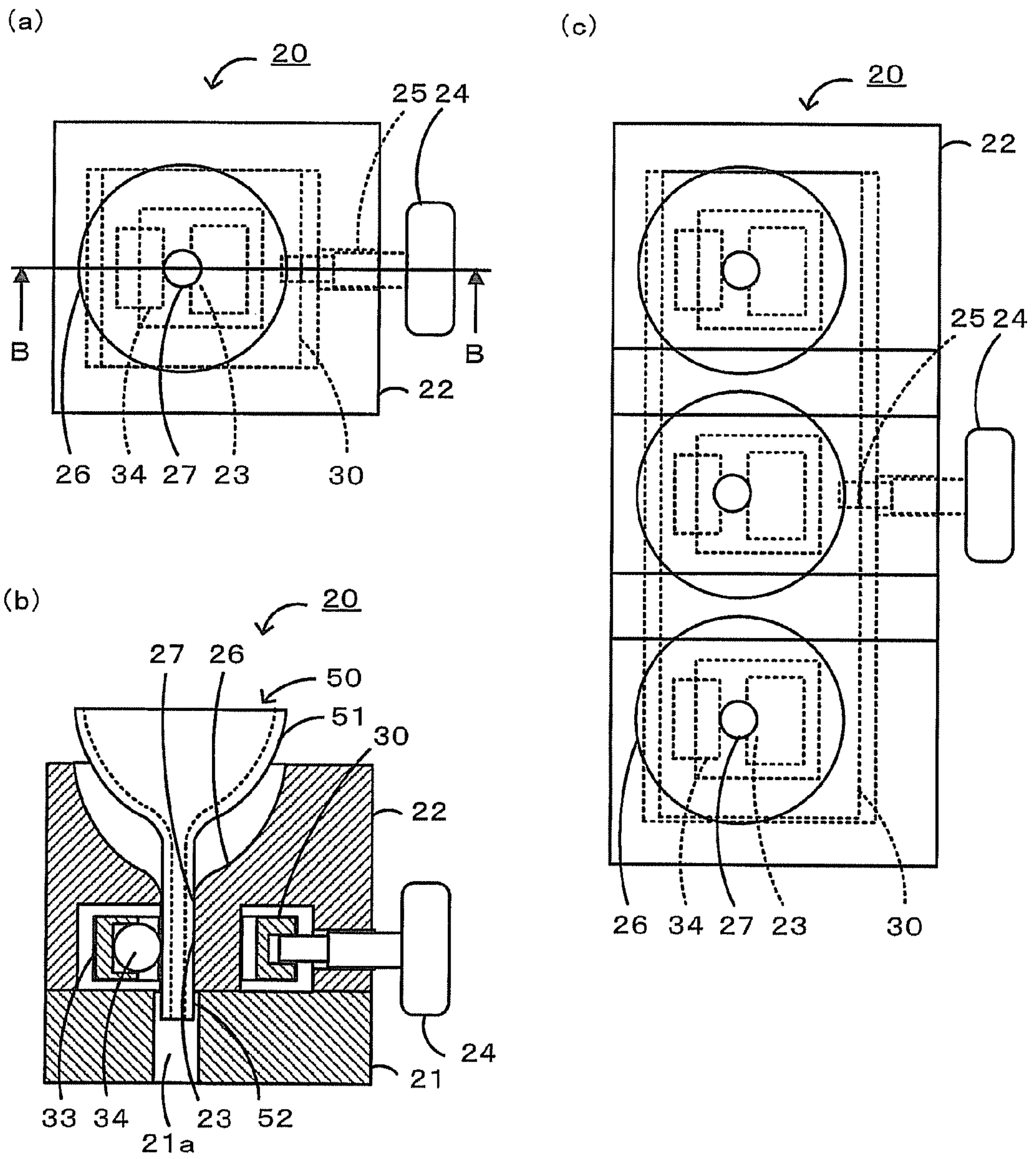
FIG. 2 is an explanatory view of a slider 30, a gripping jig 20 for assembling mounted on the assembling device 10, in which FIG. 2(*a*) is a plan view of the gripping jig 20 for assembling for fixing one molded body 50 thereto.
Figure 3:
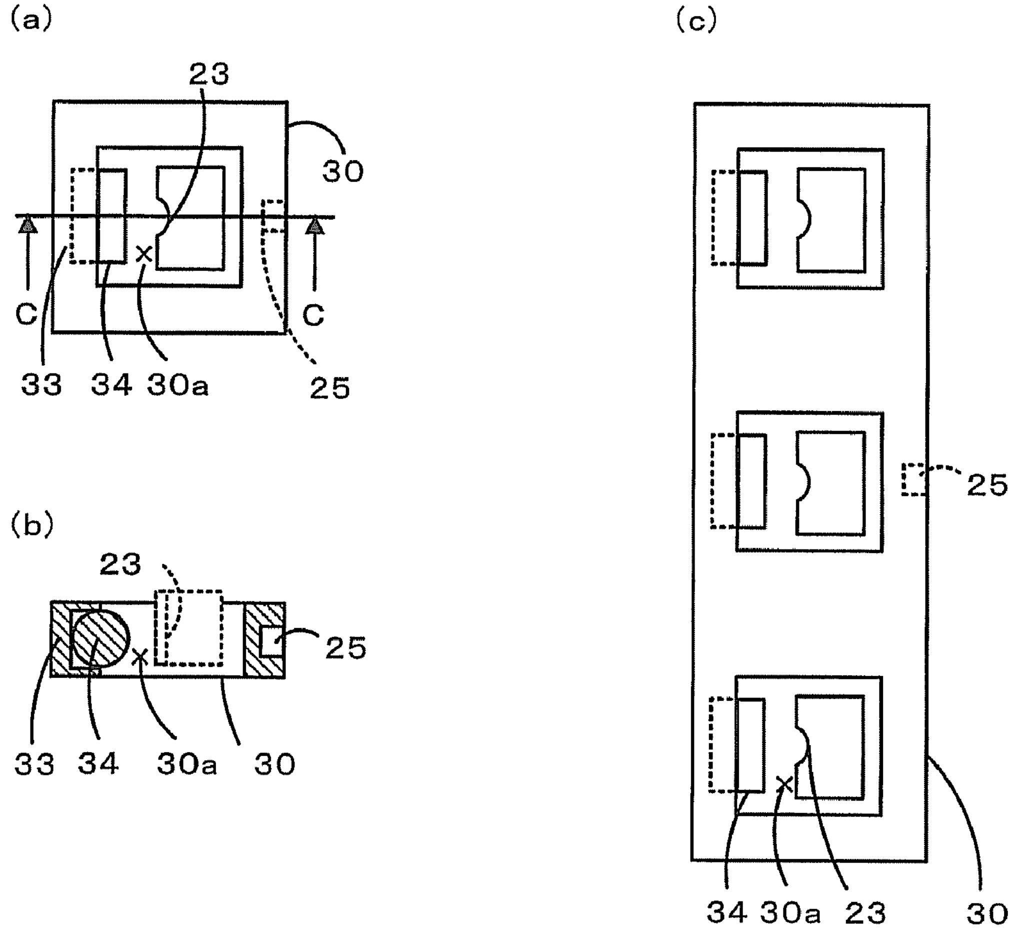
FIG. 3 is an explanatory view of a slider 30 inner-packaged in the gripping jig 20 for assembling, in which FIG. 3(*a*) is a plan view of the slider 30 for fixing one molded body 50 thereto.

Then, best modes for carrying out the invention will be described with reference to the drawings. FIG. 1 is a schematic structural view of an assembling device 10 according to an embodiment of the present invention for assembling a molded body 50, in which FIG. 1(*a*) is a front view and FIG. 1(*b*) is a sectional view at the line A-A of FIG. 1(*a*). FIG. 2 is an explanatory view of an example of a gripping jig 20 to be mounted on the assembling device 10, in which FIG. 2(*a*) is a plan view of the gripping jig 20 for assembling and fixing one molded body 50 thereto; FIG. 2(*b*) is a sectional view at the line B-B of FIG. 2(*a*); and FIG. 2(*c*) is a plan view of the gripping jig 20 for assembling and fixing a plurality of the molded bodies 50 thereto. FIG. 3 is an explanatory view of a slider 30 inner-packaged in the gripping jig 20 for assembling, in which FIG. 3(*a*) is a plan view of the slider 30 for fixing one molded body 50 thereto; FIG. 3(*b*) is a sectional view at the line C-C of FIG. 3(*a*); and FIG. 3(*c*) is a plan view of the slider 30 for fixing a plurality of the molded bodies 50 thereto. First, the molded body 50 will be described therefrom as a member to be assembled according to the present invention.

The molded body 50 is any one of a luminous-tube molded body made of a green ceramic raw material for a metal halide and a luminous-tube molded body for a high-pressure sodium vapor lamp. As shown in FIG. 2(*b*), the molded body 50 includes a cup-shaped body 51 with an upper joining part opened upward and a tubular gripping part 52, which is a part to be gripped and formed with an outer diameter smaller than that of the body 51 to communicate with the cup bottom of the body 51. The gripping part 52 has a predetermined gripping width formed to be gripped by the gripping jig 20 for assembling. That is, the gripping part 52 is formed within a range of a predetermined gripping width (within a parallel range) that allows the molded body 50 to move in the assembling direction without deforming or destroying the molded body even when the molded body 50 is pressed in the assembling direction in a state of the gripping part 52 gripped with the gripping jig 20 for assembling. When the two molded bodies 50 are joined together at their opened joining parts of the bodies 51, the bodies form a hollow sphere so as to be communicated with the outside via the through-hole of the gripping part 52. In addition, the molded body 50 is a brittle member so as to be comparatively fragile when a strong force is applied thereto, although having strength sufficient for handling.

The assembling device 10 is for being set in a hydraulic or pneumatic press work machinery (not shown) so that the molded bodies 50 are joined together by a load applied from the press work machinery. The assembling device 10, as shown in FIG. 1, includes a base table 12 for fixedly supporting the device; first mounting units 13 and 13 upward erected from the lateral ends of the base table 12, respectively, for mounting the gripping jig 20 for assembling; four movement junction rods 14 upward elected from the four corners of the base table 12, respectively; an upper table 15 supported with guide bushes 19 and guided by the movement junction rods 14 movably in the vertical direction; and second mounting units 16 and 16 downward erected from the lateral ends of the upper table 15, respectively, for mounting the gripping jig 20. On the base table 12, as shown in FIG. 1(*b*), a restriction member 12*a* is erected for positioning the first gripping jig 20 for assembling at a predetermined assembling work position. In addition, on the upper table 15, in the same way as in the base table 12, a restriction member 15*a* is also erected downwardly. The first mounting units 13 are members for positioning guide parts 28 formed at both side ends of the gripping jig 20 for assembling so as to be placed thereon, respectively. The second mounting units 16 are provided with guide grooves 16*a* formed for horizontally guiding the gripping jig 20 for assembling to the predetermined assembling work position by fitting to the positioning guide parts 28 formed at both side ends of the gripping jig 20 for assembling, respectively. For the convenience sake of description, the gripping jig 20 for assembling mounted in the first mounting units 13 and 13 is referred to as the first gripping jig 20A for assembling while the gripping jig 20 for assembling mounted in the second mounting units 16 and 16 is referred to as the second gripping jig 203 for assembling. The mounting method of the gripping jig 20 for assembling may include the fastening with screws and the attracting by an electric magnet, in addition to the above slide rail.

The gripping jig 20 for assembling, as shown in FIG. 2, includes a rectangular lower plate 21 arranged below the jig, a forming plate 22, in which the molded body 50 is set, a slider 30 movable in the front-back direction within a space formed between the lower plate 21 and the forming plate 22, and an adjustment screw 24 to adjust the fixing force applied to the molded body 50 by its rotation so as to move the slider 30 in the front-back direction. The lower plate 21 is provided with a plurality of through-holes 21*a* formed for guiding the gripping part 52 in the vertical direction, which is the assembling direction. The forming plate 22 includes a plurality of abutment surfaces 26 capable of accommodating the cup-shaped body 51 by fitting the outer surface of the body 51 into the abutment surface 26 and through-holes 27 formed above the through-holes 21*a* for every abutment surface 26. When the abutment surface 26 abuts the body 51, the junction load can be directly applied from the abutment surface 26 to this body 51. The forming plate 22 is provided with a plurality of positioning units 23 formed as parts of the through-holes 27 at positions where occupying a plurality of spaces formed in the slider 30. The positioning unit 23 is a part for gripping the gripping part 52 of the molded body 50, and it is provided at each position, in which the gripping part 52 is inserted, using the wall of the through-hole 27. The slider 30 is movable in a direction perpendicular to the assembling direction (vertical direction) of the molded body 50 along the upper surface of the lower plate 21. The slider 30, as shown in FIG. 3, includes insertion spaces 30*a* for inserting the positioning unit 23 formed on the forming plate 22 thereinto, tube retainers 33 for holding part of or the entire of the external surface of an elastic tube 34, and a tapped hole 25 to be mated with the adjustment screw 24. The elastic tube 34 is formed of a hollow rubber tube, such as a silicone tube, and has a property deformable when a load is applied. According to the embodiment, the molded body 50 is fixed by pressing the elastic tube 34 onto the gripping part 52. In addition, the through-hole 27, and the insertion space 30*a* formed in the slider 30 and a through-hole 21*a* are formed at respective positions to form a through-hole penetrating the gripping jig 20 for assembling as a whole. In the gripping jig 20 for assembling configured in such a manner, when the adjustment screw 24 is rotated in a predetermined direction, the slider 30 moves forward and the distance between the elastic tube 34 and the positioning unit 23 is reduced, so that a fixing force can be applied to the molded body 50 by pressing the gripping part 52 inserted into the through-hole 27 and the through-hole 21*a* with the elastic tube 34 so as to apply a pressing load from a direction perpendicular to the assembling direction.

Figure 4:
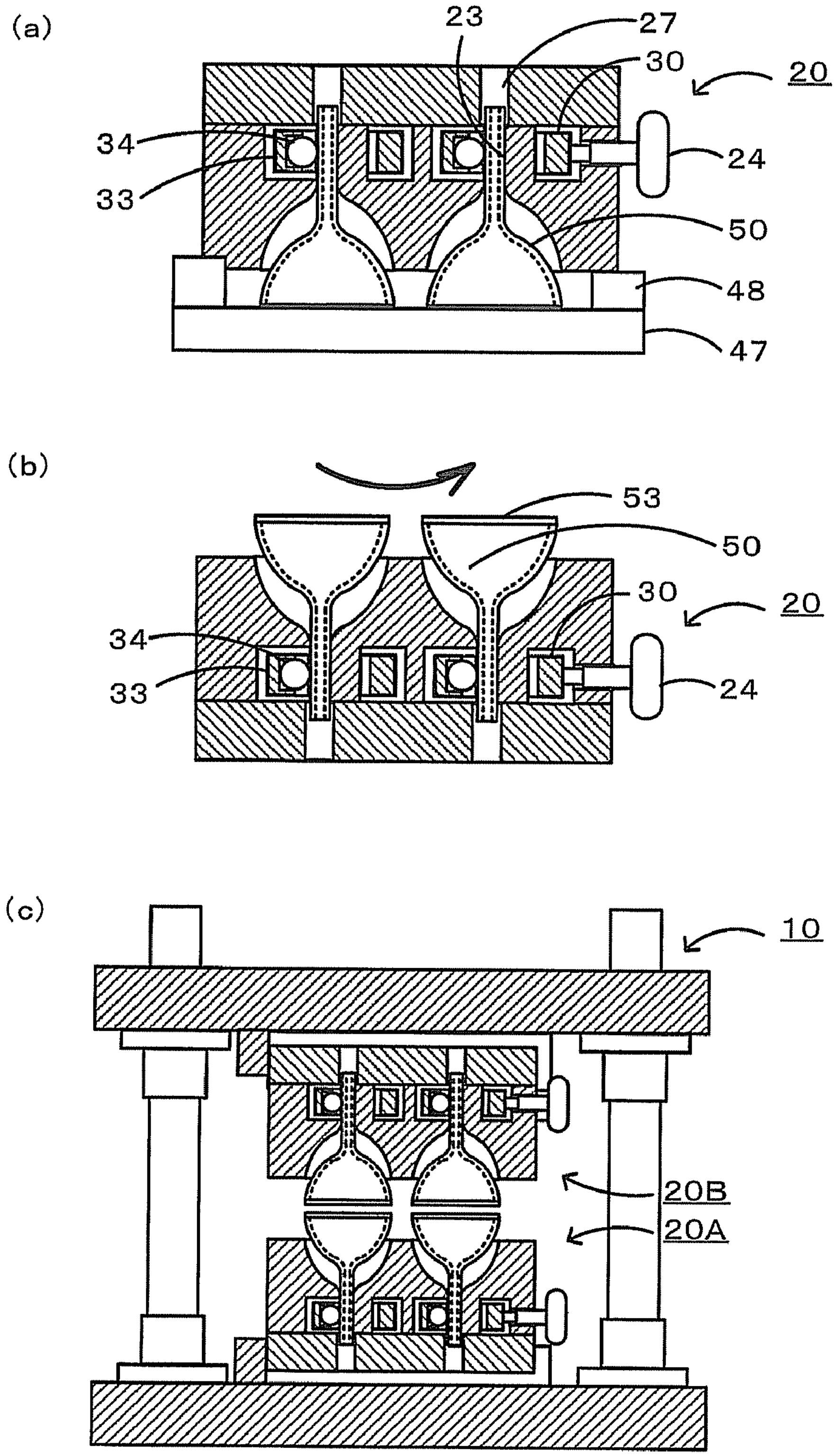
FIG. 4 is an explanatory view of a fixing process of the molded body 50, an applying process of a cementing material, and the mounting of the gripping jig 20 for assembling on the assembling device 10.
Figure 5:
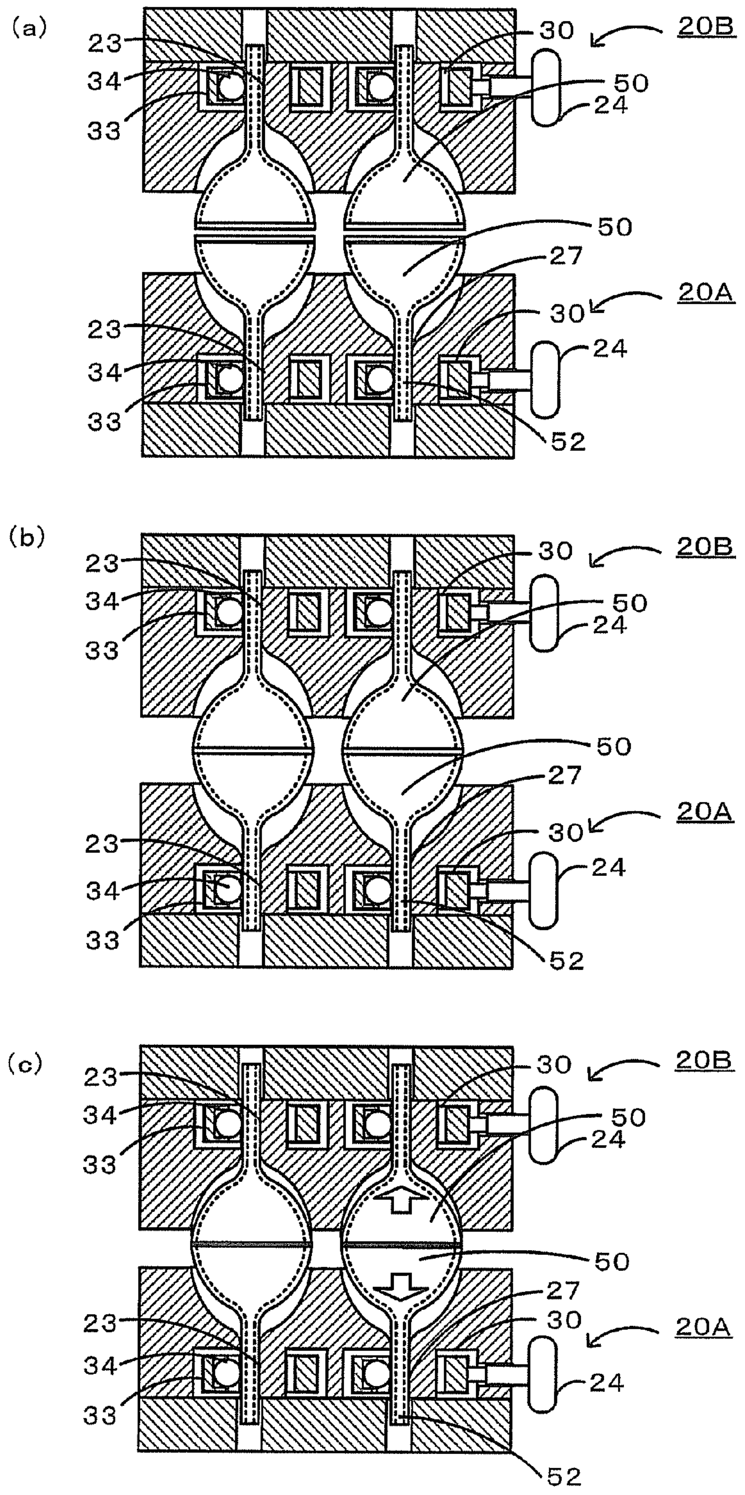
FIG. 5 is an explanatory view of assembling the molded body 50.

Then, a producing method of a sintered body using the assembling device 10 and the gripping jig 20 for assembling will be described. In this producing method, a plurality of the molded bodies 50 before sintering are produced (molded body forming process); these molded bodies 50 are fixed to the gripping jig 20 for assembling (fixing process); the molded body 50 fixed to the gripping jig 20 for assembling is coated with a cementing material (applying process); the molded bodies 50 are joined together using the assembling device 10 (assembling process); and the assembled body is dried and sintered (drying process, sintering process) so as to obtain the sintered body. FIG. 4 is an explanatory view illustrating the fixing process of the molded body 50, the applying process of the cementing material, and the mounting the gripping jig 20 for assembling on the assembling device 10; and FIG. 5 is an explanatory view illustrating the assembling of the molded bodies 50. In FIG. 5, the assembling device 10 is omitted. First, a plurality of the molded bodies 50 are produced (molded body forming process). The molded body 50 may be produced from a predetermined raw material (alumina, for example) by a known producing method, such as a gel cast method, injection molding, and a dry-back method. The molded body 50 is herein molded by the gel cast method, using the material powder mixture of alumina powder, magnesia, a dispersion medium, a gelatinizing agent, a dispersion agent, and a catalyst, as molding slurry. In addition, during the material preparing, cementing slurry may also be prepared as a cementing agent in the same way as in the slurry for the molded body; however, the cementing agent used in the applying process is generally and separately prepared from non-self-curing cementing slurry containing the same inorganic powder as in the predetermined material for forming the molded body 50.

Figure 6:
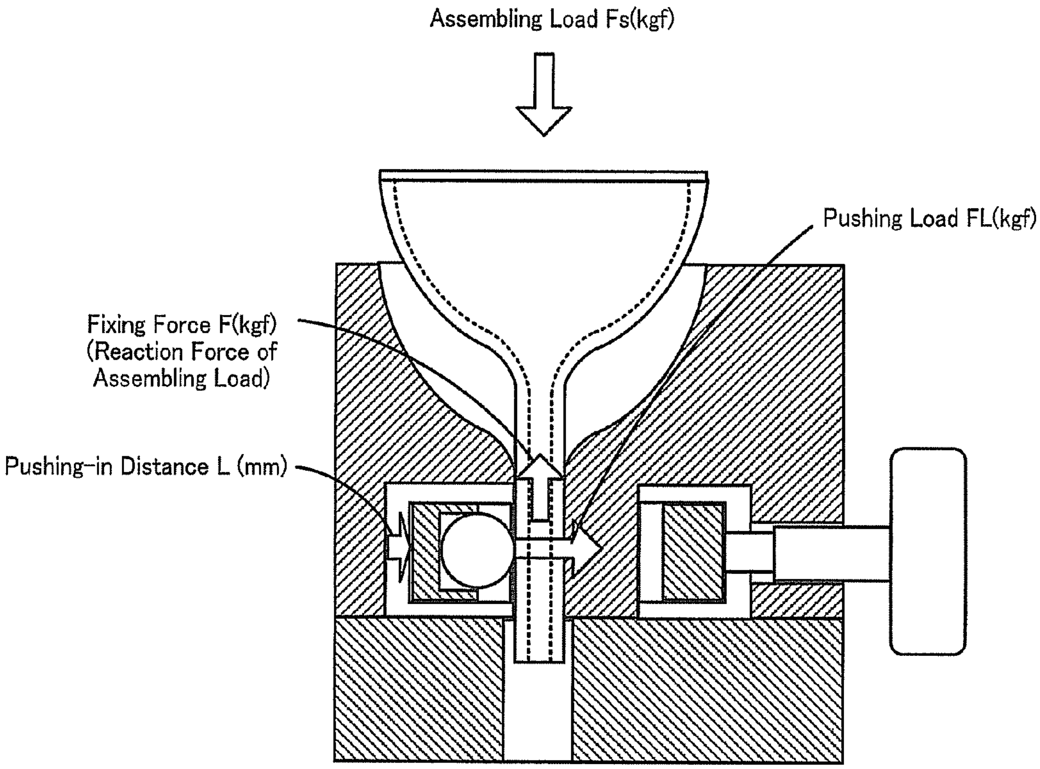
FIG. 6 is an explanatory view of a push-up distance L, a pushing load FL, a fixing force F, and an assembling load Fs.

Then, the process proceeds to the fixing process in which the molded body 50 is set in the gripping jig 20 for assembling. In this process, the gripping jig 20 for assembling is upward directed; the gripping part 52 of the obtained molded body 50 is inserted into the through-hole 27; the adjustment screw 24 is tightened while the body 51 being in contact with the abutment surface 26; and the gripping part 52 is pushed with the elastic tube 34 toward the positioning unit 23, so that the molded body 50 is fixed to the gripping jig 20 for assembling. At this time, the adjustment screw 24 is tightened for applying the fixing force to the gripping part 52 to the extent that the molded body 50 is held even when the gripping jig 20 for assembling is turned bottom up. Then, a shim plate 48, which is a rectangular frame, is placed on a rectangular platen 47 with a smooth upper surface; and the gripping jig 20 for assembling is inverted so that ends of the upper surface of the gripping jig 20 for assembling with no abutment surface 26 formed thereon are placed on the shim plate 48. Then, the adjustment screw 24 is loosened so as to cancel the fixing of the molded body 50. Then, as shown in FIG. 4(*a*), while the body 51 is being separated from the abutment surface 26 by the thickness of the shim plate 48, the joining part of the molded body 50 is aligned with the upper surface of the platen 47. In this state, the adjustment screw 24 is rotated by a predetermined number of revolutions so as to apply the fixing force obtained by experiments in advance to the molded body 50, and is fastened. As shown in FIG. 6, the fixing force F(kgf) corresponds to the reaction force of the assembling load Fs(kgf) applied to the molded body 50. The fixing force F(kgf) is established based on the pushing load FL(kgf) applied to a direction perpendicular to the axial direction of the gripping part 52 by corresponding to the pushing-in distance L(mm) produced by tightening the adjustment screw 24 so as to move the elastic tube 34 toward the positioning unit 23. That is, the relationship between the pushing-in distance L, the pushing load FL, and the fixing force F at that time is empirically obtained in advance, and the number of fastening revolutions of the adjustment screw 24 is made so that the slider 30 moves by the pushing-in distance L capable of obtaining the desired fixing force F. The fixing force F is herein set at the value such that the assembling load Fs is applied to the molded body 50 even when the molded body 50 would move to slide along the through-holes 27. Depending on the shapes and properties of the brittle molded body 50, the fixing force F may preferably range from 100 gf to 1200 gf, and more preferably from 200 gf to 800 gf. If the fixing force F is 100 gf or more, the sufficient junction strength can be obtained. If the fixing force F is 1200 gf or less, the deformation of the molded body 50 can be prevented. Depending on the shapes and properties of part of the molded body 50 to be pushed, the pushing load FL may preferably range from 50 gf to 1000 gf, and more preferably from 200 gf to 700 gf. If the pushing load FL is 50 gf or more, the assembling load Fs can be sufficiently applied to the molded body 50. If the pushing load FL is 1000 gf or less, the deformation and destruction of the molded body 50 can be prevented. In such a manner, the molded body 50 is fixed so that the molded body 50 is floated from the abutment surface 26 of the gripping jig 20 for assembling as well as the joining parts are aligned with each other. In this gripping jig 20, the entire joining parts of the molded bodies 50 can be aligned with each other by a simple method in which after the molded body 50 is temporarily fixed, the adjustment screw 24 is loosened and subsequently fixed while the molded bodies 50 being inverted. A plurality of the gripping jigs 20 for assembling are prepared in which the molded bodies 50 are fixed so as to make the molded bodies 50 float from the abutment surfaces 26.

Then, the joining part of the fixed molded body 50 is coated with the cementing agent slurry (applying process). The application of the cementing agent slurry to the joining part of the molded body 50 may use a printing technique, such as screen printing and metal mask printing, in addition to known liquid supplying techniques, such as a dispenser, dipping, and spraying. Here, as shown in FIG. 4(*b*), by the screen printing, the cementing agent slurry is applied to the joining part of the molded body 50 to form a cementing material 53 on the joining part. Even though there may be molded bodies 50 of different sizes due to dry-shrinkage among a plurality of the molded bodies 50, since the gripping jig 20 and the molded bodies 50 are fixed while being floating from the abutment surfaces 26 as well as the joining parts being aligned with each other, as mentioned above, a small-amount cementing material 53 can be uniformly applied on the entire molded bodies 50 more easily. Also, since each molded body 50 is fixed to the gripping jig 20 for assembling with the pushing load FL sufficient for the predetermined assembling load applied thereto, during the cementing material 53 application, the molded body 50 can be prevented from adhering to a printing plate. After the cementing material 53 is formed on the joining part in such a manner, one gripping jig 20 for assembling is mounted on the first mounting unit 13 so that the joining part is upward directed while the other gripping jig 20 for assembling is mounted on the second mounting unit 16 so that the joining part is downwardly directed as shown in FIG. 4(*a*). The guide part of the first gripping jig 20A for assembling is placed on the first mounting unit 13, and the first gripping jig 20A for assembling is moved until the rear end of the gripping jig 20 for assembling abuts the restriction member 12*a* so as to mount it. Similarly, the guide part of the second gripping jig 20B for assembling is fitted into the guide groove 16*a*, and the second gripping jig 20B for assembling is moved until the rear end of the gripping jig 20 for assembling abuts the restriction member 15*a* so as to mount it. In addition to the restriction members 12*a* and 15*a*, the positioning of the first gripping jig 20A for assembling and the second gripping jig 20B for assembling may also be performed by engaging a projection (not shown) provided in the first gripping jig 20A for assembling with a recess (not shown) provided in the second gripping jig 20B for assembling.

Subsequently, the second gripping jig 20B for assembling is moved toward the first gripping jig 20A for assembling by downward moving the upper table 15 (see FIG. 1) so as to start the assembling process (FIG. 5(*a*)). When the first gripping jig 20A for assembling is moved, the joining part of the molded body 50 fixed to the first gripping jig 20A for assembling abuts the joining part of the molded body 50 fixed to the second gripping jig 20B for assembling (FIG. 5(*b*)). When the second gripping jig 20B is further moved toward the first gripping jig 20A for assembling, the assembling load Fs starts to be applied to the two molded bodies 50 so as to gradually increase. When the second gripping jig 20B for assembling is furthermore moved, the assembling load Fs applied to the molded bodies 50 becomes the maximum fixing force, i.e., the maximum assembling load Fsmax, and the molded body 50 relatively moves along the through-hole 27 (FIG. 5(*c*)). At this time, the assembling load Fs the maximum assembling load Fsmax) is maintained being applied to the molded body 50. As mentioned above, the joining parts of a plurality of the molded bodies 50 are flush with one plane; however, during the application of the cementing material 53, the displacement in the assembling direction and variations in coating thickness may occur so that some joining parts are not flush with one plane among the entire molded bodies 50. Even so, when the molded body 50 sequentially abuts the opposing molded body 50 in order to form the molded body 50 with the joining part protruding from the one plane to the maximum so as to move along the through-hole 27, so that the entire molded bodies 50 are moved along the through-holes 27, the maximum assembling load Fsmax is substantially uniformly applied to the entire molded bodies 50. In addition, among the molded bodies 50, when the second gripping jig 20B is moved toward the first gripping jig 20A until the body 51 abuts the abutment surface 26, the assembling load over the maximum assembling load Fsmax may be applied to some molded bodies 50 in an abutted state. When the entire molded bodies 50 move along the through-holes 27 or when the second gripping jig 20B is moved toward the first gripping jig 20A until the outer body 51 abuts the abutment surface 26 among some of the molded bodies 50, the assembling process is completed, so that the application of the fixing force to the molded body 50 is cancelled by loosening the adjustment screw 24; and by separating the first gripping jig 20A from the second gripping jig 20B so as to remove the assembled body, in which molded bodies are joined together with the cementing material 53, from the gripping jig 20 for assembling. In such a manner, a plurality of the assembled bodies are obtained.

Subsequently, the obtained assembled bodies are dried and sintered. The drying process may be appropriately established corresponding to the composition and the supply amount of the assembling slurry, and the process is generally performed at a temperature of 40° C. to 200° C. for about 5 to 120 min. After the drying process, ingredients contained in the molded body 50 and the cementing material 53 are sintered by burning the assembled body so as to obtain the sintered body (sintering process). For suppressing the blackening of the sintered body, it is preferable to degrease or calcinate the assembled body prior to the sintering process. The sintered body obtained in such a manner may be used for luminous tubes of discharge lamps such as luminous tubes for a metal halide lamp and a high-pressure sodium vapor lamp.

Here, the corresponding relationship between the components according to the embodiment and the components according to the present invention will be explained. The molded body 50 according to the embodiment corresponds to the member for assembling according to the present invention; the through-holes 27 and the through-hole 21*a* correspond to the movement part; the slider 30 corresponds to the fixing force applying part and the sliding part; the adjustment screw 24 corresponds to the adjusting unit; the abutment surface 26 corresponds to the abutment part; the elastic tube 34 corresponds to the pushing part; the first mounting unit 13 corresponds to the first mounting unit; the second mounting unit 16 corresponds to the second mounting unit; and the movement assembling rod 14 and the upper table 15 correspond to the moving-assembling unit.

In the assembling device 10 according to the embodiment and above described in detail, the gripping jig 20 for assembling applies the fixing force to the molded body 50 with the slider 30 from the direction perpendicular to the assembling direction of the molded body 50; when the assembling load Fs or more is applied to the molded body 50, the fixing force F can be adjusted with the adjustment screw 24 so that the molded body 50 is guided with the through-hole 27 to move in the assembling direction. In such a manner, since the fixing force F is applied to the molded body 50 from a direction different from the assembling direction, the molded body 50 can be moved in the assembling direction; since the fixing force F can be adjusted with the adjustment screw 24, the application of the assembling load Fs to the molded body 50 and the movement of the molded body 50 are adjustable. Hence, loads over the maximum assembling load Fsmax can be suppressed from being applied to the molded body 50. Since each of a plurality of the molded bodies 50 is fixed and assembled, when loads over the maximum assembling load Fsmax are applied to the molded bodies 50 having variations in size, the respective molded bodies 50 are guided with the through-holes 27 to move, so that the more uniform maximum assembling load Fsmax can be applied to a plurality of the entire molded bodies 50. In such a manner, it is not necessary to excessively apply the cementing material 53 in thickness to a plurality of the molded bodies 50 for covering small-sized bodies in joining strength, reducing the amount of the cementing material 53 for joining the molded bodies 50. Thus, variations in thickness of the joining parts are suppressed, the mechanical strengths are also uniform, and transmittances are easily unified so as to be preferably used in the luminous tube of the discharge lamp. Since the fixing force is applied from the direction perpendicular to the assembling direction, while the sufficient fixing force can be applied to the molded body 50, when the maximum assembling load Fsmax is applied, the molded body 50 is easily movable due to the slippage. Since the molded body 50 is fixed by applying the fixing force to the gripping part 52, the molded body 50 may be movably fixed. Also, since the positioning unit 23 uses the inner wall of the through-hole, a specific structure for positioning the molded body 50 is not additionally required.

Since the gripping jig for assembling is provided with the abutment surface 26 formed to have the shape corresponding to the outer contour of the body 51, when the abutment surface 26 abuts the molded body 50, a load over a predetermined joining load can be applied to the molded body 50. Furthermore, since the slider 30 uses the elastic tube 34, which is an elastic hollow member, as a pushing part, the molded body 50 can be softly fixed by the elastic tube 34, which is becoming deformed following the application of the fixing force, so as to fix the molded body 50 in a more protected state. Furthermore, since the fixing force can also be adjusted by changing the position of the slider 30 with the adjustment screw 24, the molded body 50 can be fixed with a comparatively simple structure. The molded body 50 is any one of a luminous-tube molded body formed of a ceramic raw material for a metal halide lamp before sintering and a luminous-tube molded body for a high-pressure sodium vapor lamp, and these luminous tubes are brittle members, so that they need to be suppressed from being excessively applied by a joining load, so that the incorporation of the present invention is significant. Since the assembling device 10 uses the mounted gripping jig 20 for assembling, the device exhibits the same effect as that of the gripping jig 20 for assembling. Since the second gripping jig 20B is lowered in the vertical direction, the first gripping jig 20A can be comparatively easily abutted to the second gripping jig 20B and the molded bodies 50 can be assembled using self-weights of the second gripping jig 20B and the upper table 15 as the joining load.

In the producing method of the assembled body, the fixing force F, which is adjusted so as to move the molded body 50 by being guided with the through-hole 27 when the maximum assembling load Fsmax or more is applied to the molded body 50, is applied from a direction perpendicular to the assembling direction; while the molded body 50 being not in contact with the abutment surface 26, the molded body 50 is fixed to the gripping jig 20 for assembling; the joining part of the fixed molded body 50 is coated with the cementing material; and a plurality of the gripping jigs for assembling having the molded bodies 50 fixed thereto are opposed to each other so as to join the molded bodies 50 together. In such a manner and in the same way as in the gripping jig 20 for assembling described above, loads over a predetermined joining load can be suppressed from being applied to the molded body 50. In the fixing process, the molded bodies 50 are arranged in a plurality of the through-holes 27, respectively; the respective joining parts are aligned with the upper surface of the platen 47; and the aligned molded bodies 50 are fixed with the slider 30, so that the more uniform maximum assembling load Fsmax can be applied to a plurality of the entire molded bodies 50 because of the assembling in a state of a plurality of the molded bodies 50 aligned with a predetermined plane.

The present invention is not entirely limited to the embodiment described above, so that various modifications can be obviously made within a technical scope of the present invention.

Figure 7:
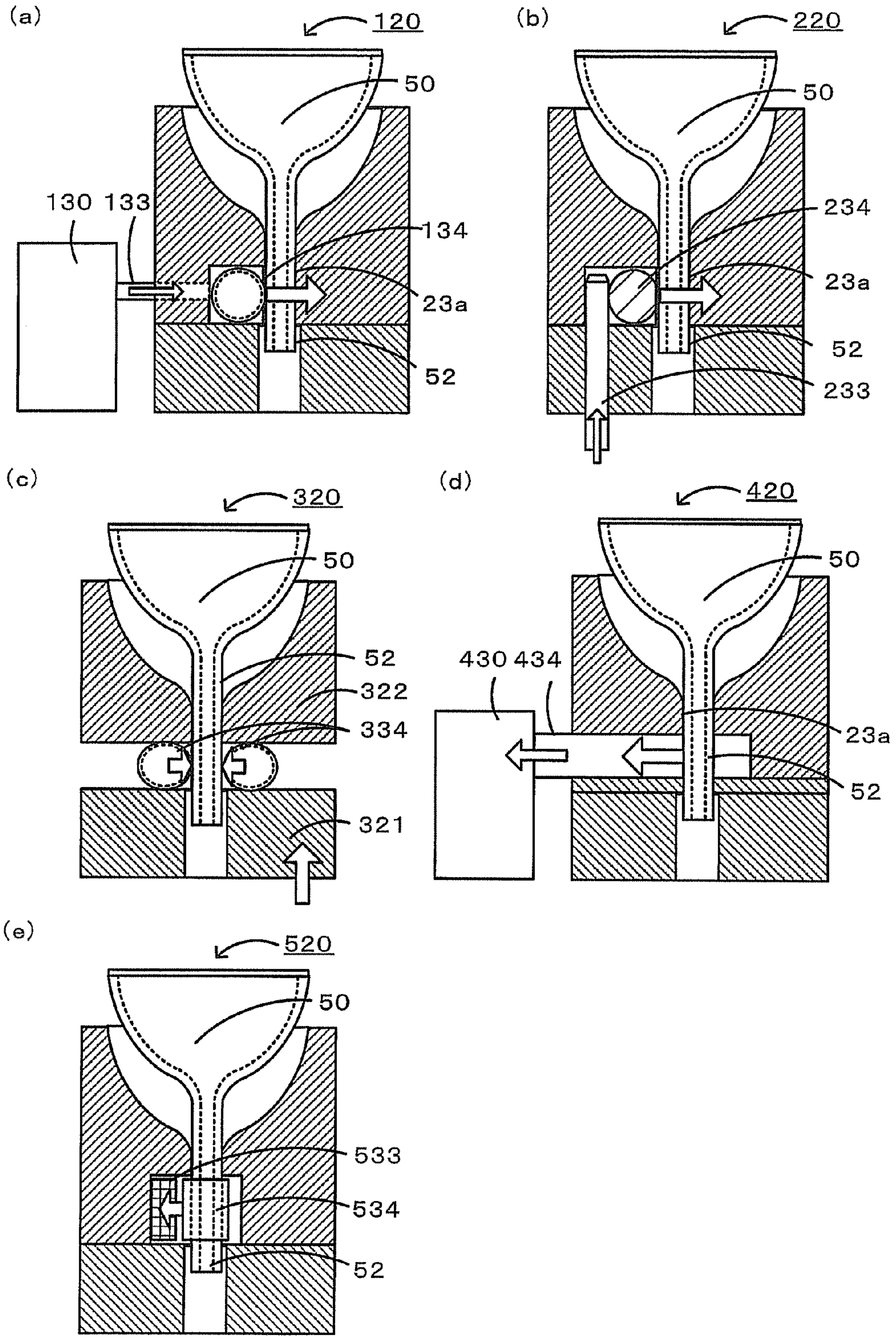
FIG. 7 is an explanatory view of another gripping jig for assembling.

In the embodiment described above, the gripping jig 20 for assembling is configured so that the fixing force F is applied to the molded body 50 by sliding the slider 30 with the adjustment screw 24 in a direction perpendicular to the assembling direction; alternatively, various modifications shown in FIG. 7 may be made. For example, as shown in FIG. 7(*a*), a gripping jig 120 for assembling may be configured in which an elastic tube 134 is arranged at a position adjoining the gripping part 52; and a fluid, such as air, pressurized with a pressure pump 130 is supplied to the elastic tube 134 via a supply pipe 133 so as to inflate the elastic tube 134 by pressurizing the inside of the elastic tube 134 for applying the fixing force to the molded body 50. At this time, the fixing force F is to be adjusted with the pressure pump 130. By doing so, the fixing force may be applied to the molded body 50 with a comparatively simple structure that inflates the elastic tube 134. As shown in FIG. 7(*b*), a gripping jig 220 for assembling may also be configured in which an elastic tube 234 is arranged at a position adjoining the gripping part 52; and the elastic tube 234 is deformed by taking out or putting in a pressure pin 233 so as to apply the fixing force to the molded body 50. At this time, the fixing force F is to be adjusted with the position of the pressure pin 233. By doing so, the molded body 50 can also be moved in the assembling direction, and loads over the maximum assembling load Fsmax can be suppressed from being applied to the molded body 50. As shown in FIG. 7(*c*), a gripping jig 320 for assembling may also be configured in which elastic tubes 334 and 334 are arranged at positions adjoining the gripping part 52; and the elastic tubes 334 and 334 are deformed by moving a lower plate 321 toward a forming plate 322 so as to apply the fixing force to the molded body 50. At this time, the fixing force F is to be adjusted with the position of the lower plate 321. By doing so, loads over the maximum assembling load Fsmax can also be suppressed from being applied to the molded body 50. Alternatively, as shown in FIG. 7(*d*), a gripping jig 420 for assembling may also be configured in which a vacuum tube 434 is arranged at a predetermined position of the gripping part 52; and negative pressure is generated in the vacuum tube 434 with a vacuum pump 430 connected to the vacuum tube 434 so as to apply the fixing force to the molded body 50 by drawing the gripping part 52. At this time, the fixing force F is to be adjusted with the negative pressure degree generated with the vacuum pump 430. By doing so, loads over the maximum assembling load Fsmax can also be suppressed from being applied to the molded body 50. Also, as shown in FIG. 7(*e*), a gripping jig 520 for assembling may also be configured in which a tubular fixing member 534 formed of a magnetic body (iron for example) is provided at a predetermined position of the through-hole 27; and the gripping part 52 is inserted into the fixing member 534 so as to apply the fixing force to the molded body 50 by drawing the fixing member 534 with an electric solenoid 533. At this time, the fixing force F is to be adjusted with the magnetic force of the electric solenoid 533. By doing so, loads over the maximum assembling load Fsmax can also be suppressed from being applied to the molded body 50. In addition, in the various gripping jigs for assembling described above, the positioning units 23 may also be provided, respectively.

According to the embodiment described above, the forming plate 22 is provided with the abutment surface 26 formed thereon; however, it may be omitted. Even so, loads over the maximum assembling load Fsmax can also be suppressed from being applied to the molded body 50. At this time, it is preferable that the assembling load be applied to the molded body 50 within a range that the body 51 is not in contact with the forming plate 22.

According to the embodiment described above, the gripping jig 20 for assembling is configured in which a plurality of the abutment surfaces 26 and a plurality of the through-holes 27 are provided for assembling a plurality of the molded bodies 50, respectively; however, it may also be for assembling one molded body 50. Even so, loads over the maximum assembling load Fsmax can also be suppressed from being applied to the molded body 50.

According to the embodiment described above, the fixing force F is applied by applying the pushing load FL to the molded body 50 with the slider 30 in a direction perpendicular to the assembling direction; however, the fixing force F may also be applied by applying the pushing load FL from any direction other than the assembling direction.

According to the embodiment described above, the gripping part 52 is fixed by pushing it with the elastic tube 34 formed of a hollow rubber member; however, it may also be fixed by pushing the gripping part 52 with a non-hollow member, and instead of the rubber, an elastic body, such as a spring, a sponge, and felt, may also be used.

Figure 8:
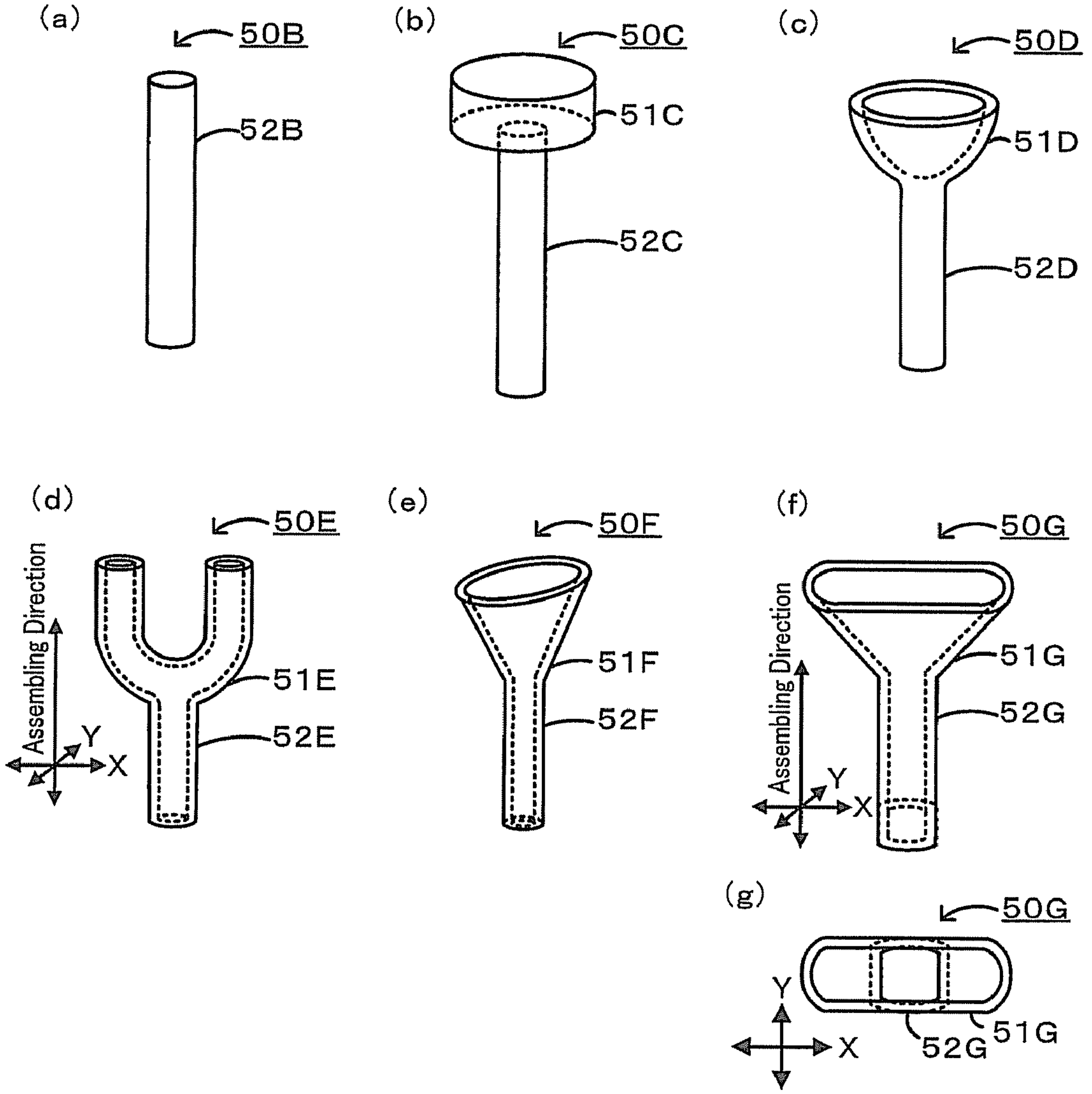
FIG. 8 is an explanatory view of molded bodies 50B to 50G.

According to the embodiment described above, gripped is the molded body 50 having the cup-shaped body 51 and the cylindrical gripping part 52; however, the invention is not specifically limited to this, so that variously shaped molded bodies may also be gripped. FIG. 8 is an explanatory view of variously shaped molded bodies 50B to 50F. For example, there may be the molded body 50B (FIG. 8(*a*)) having the non-hollow columnar gripping part 52B without the body 51 abutting the abutment surface 26; the molded body 50C (FIG. 8(*b*)) having the columnar body 51C and the columnar gripping part 52C with an outer diameter smaller than that of the body 51C; the molded body 50D (FIG. 8(*c*)) having the cup-shaped body 51D and the columnar gripping part 52D; the molded body 50E (FIG. 8(*d*)) having the body 51E that is a U-tube and the cylindrical body 51E communicated with the body 51E; the molded body 50F (FIG. 8(*e*)) having the funnel-shaped body 51F and the column 51F; and the molded body 50G (FIGS. 8(*f*) and 8(*g*)) including the body 51G tapered toward the gripping part 52G and having an elliptical opening, and the roughly prism-shaped gripping part 52G with substantially the same width as that of the body 51G. At this time, in the molded body 50E and the molded body 50G, for example, when the longitudinal direction of the molded body perpendicular to the assembling direction is plotted in the X axis and the direction further perpendicular to the X axis is plotted in the Y axis, the movement of the molded body in the X axial direction may be restricted by gripping the molded body with the elastic tube 34 and the positioning unit 23; and the movement of the molded body in the Y axial direction may also be restricted by the abutment surface 26. According to the embodiment described above, in the molded body 50, the gripping part 52 is formed so that the gripping jig 20 for assembling grips the molded body 50 with a predetermined gripping width; however, the gripping width is not specifically limited to the predetermined value, so that the gripping part 52 may also be formed to have a constant gripping width within a range (within the parallel range) that the molded body 50 is movable in the assembling direction without deformation and destruction even when the molded body 50 gripped with the gripping jig 20 for assembling is pushed from the assembling direction.

According to the embodiment described above, the fixing force F is adjusted with the adjustment screw 24; alternatively, any component may be used that is adjustable the fixing force F in accordance with the distance between the positioning unit 23 and the elastic tube 34, and a cam that is adjustable the fixing force F by changing the position of the slider 30 may also be used.

In addition, the gripping jig for assembling according to the present invention is also applicable to the uniform applying of a cementing material by stamping or dipping, for example, and to the applying substantially equal stress to a plurality of end surfaces.

EXAMPLE 1

In EXAMPLE 1, a luminous tube was produced as a sintered body. A molded body for the sintered body was produced as follows. That is, the base powder for the molding slurry was the mixture of 100 parts by weight of alumina powder, 0.025 parts by weight of magnesia, 27 parts by weight of a dispersion medium, 0.3 parts by weight of ethylene glycol, 4 parts by weight of a gelatinizing agent, 3 parts by weight of a dispersing agent, and 0.1 parts by weight of a catalyst; this slurry was molded with a mold into the molded body 50 as a half split of a luminous-tube for a metal halide lamp cut along a plane including a symmetrical axis perpendicular to its longitudinal direction. The molded body 50 has an outer diameter of 12.5 mm, an inner diameter of 10 mm, a joining area of 44.2 mm$^2$, and a three-point flexural strength of 0.3 kgf/mm$^2$. The three-point flexural strength was obtained in conformity with the testing method of the three-point flexural strength corresponding to $\sigma_{b3}$ of JIS-R1601 (1995). The slurry for the cementing material was prepared as follows. That is, the cementing slurry was the mixture of the base powder of alumina powder (100 parts by weight), magnesia powder (0.025 parts by weight), and diethylene glycol monobutyl ether (40 parts by weight); and the binder of a butyral resin (22 parts by weight).

Next, the gripping jig 20 for assembling capable of fixing 70 molded bodies 50 thereto was upward placed; the gripping part 52 of the obtained molded body 50 was inserted into the through-hole 27; and the molded body 50 was fixed to the gripping jig 20 for assembling by tightening the adjustment screw 24 while the body 51 being contact with the abutment surface 26. This gripping jig 20 for assembling was inverted so as to place it on the shim plate 48 placed on the platen 47; and the joining part of the molded body 50 was aligned with the platen 47 by loosening the adjustment screw 24. In this state, the adjustment screw 24 was rotated by a predetermined number of revolutions and fastened so that a predetermined fixing force is applied to the molded body 50. Then, a screen form plate of a ring-shaped pattern (outer diameter 11.8 mm, inner diameter 10.1 mm) with an emulsion thickness of 100 μm and #290 mesh was used; the screen form plate was fixed on the stage of a screen printing machine so as to be in parallel with the joining part (outer diameter 12.5 mm, inner diameter 10.0 mm) of the molded body 50 and was aligned with the machine. Then, the prepared cementing slurry was supplied on the joining part of the molded body in the screen printing machine using the form plate. The application quantity of the cementing material was 15 mg/body. The two gripping jigs 20 for assembling were prepared so as to mount them on the assembling device 10 so that the joining parts are opposed to each other; and the assembled bodies were obtained by pressing the bodies to have an assembling load Fs of 250 gf/body. The assembled bodies were sintered after drying them in an oven at 80° C. for 10 minutes so as to make them dense and translucent. In such a manner, the sintered body (luminous tube) of EXAMPLE 1 was obtained. The number of the molded bodies fixed to the gripping jigs 20 for assembling of EXAMPLE 1, the outer diameter, the inner diameter, and the joining area of the body, the application quantity of the cementing material, and the assembling loads are shown in Table 1. In Table 1, data of EXAMPLES 2 and 3 are also shown.

TABLE 1

| | Number of Molded Bodies | Outer Diameter mm | Inner Diameter mm | Joining Area mm$^2$ | Application Quantity of Cementing Material mg/body | Assembling Load gf/body |
|---|---|---|---|---|---|---|
| EXAMPLE 1 | 70 | 12.5 | 10.0 | 44.2 | 15 | 250 |
| EXAMPLE 2 | 30 | 18.5 | 16.0 | 67.7 | 19 | 450 |
| EXAMPLE 3 | 15 | 27.0 | 24.0 | 120.2 | 34 | 600 |

EXAMPLE 2

Using an aluminum-alloy mold with an outer diameter of 18.5 mm, an inner diameter of 16 mm, and a joining area of 67.7 mm$^2$, the molded body 50 was molded; the gripping jig 20 for assembling capable of fixing 30 molded bodies 50 thereto was used; a screen form plate of a ring-shaped pattern (outer diameter 17.8 mm, inner diameter 16.2 mm) with an emulsion thickness of 100 μm and #290 mesh was used; and the sintered body (luminous tube) of EXAMPLE 2 was obtained after passing through the same processes as those of EXAMPLE 1 except for the application quantity of the cementing material of 19 mg/body and the assembling load of 450 gf/body.

EXAMPLE 3

Using an aluminum-alloy mold with an outer diameter of 27 mm, an inner diameter of 24 mm, and a joining area of 120.2 mm$^2$, the molded body 50 was molded; the gripping jig 20 for assembling capable of fixing 15 molded bodies 50 thereto was used; a screen form plate of a ring-shaped pattern (outer diameter 26.1 mm, inner diameter 24.2 mm) with an emulsion thickness of 100 μm and #290 mesh was used; and the sintered body (luminous tube) of EXAMPLE 3 was obtained after passing through the same processes as those of EXAMPLE 1 except for the application quantity of the cementing material of 34 mg/body and the assembling load of 600 gf/body.

Figure 9:
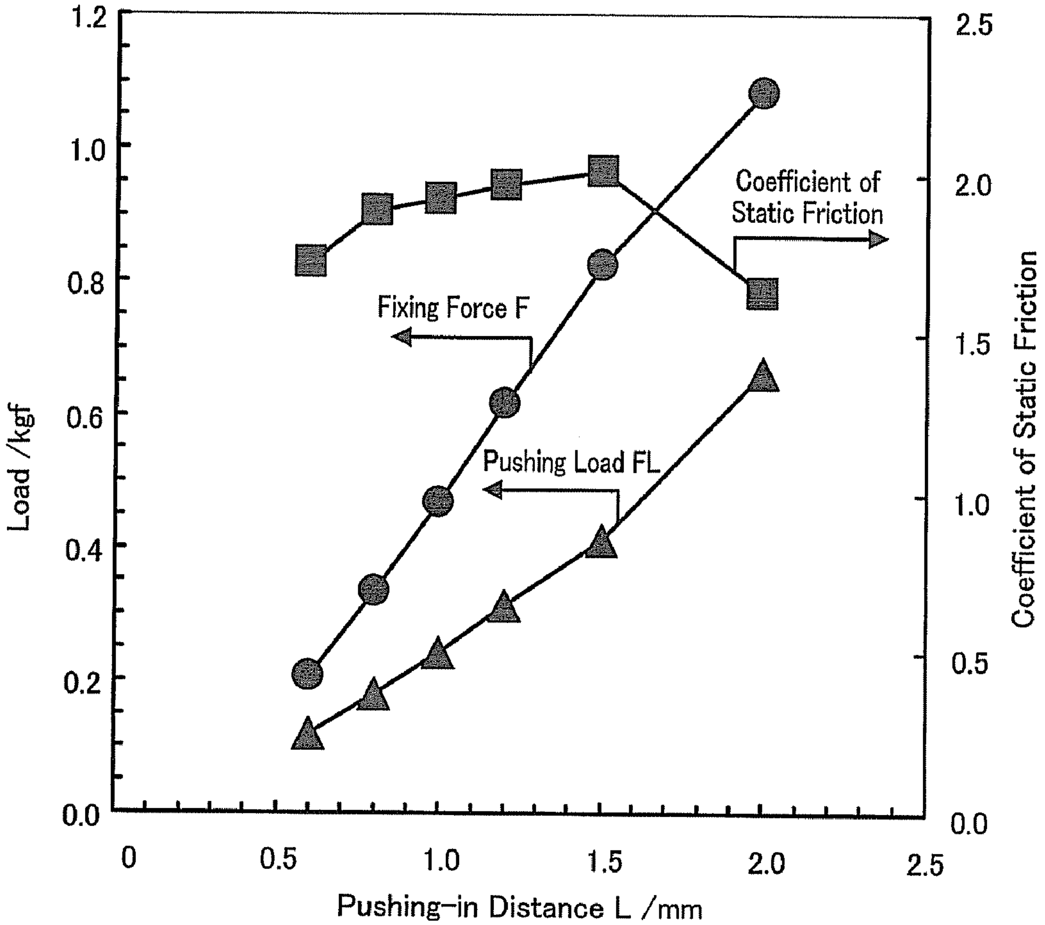
FIG. 9 is an explanatory view of the relationship between the push-up distance L, the pushing load FL, the fixing force F, the assembling load Fs, and the coefficient of static friction of samples.

Using EXAMPLE 3, the relationship between the pushing-in distance L, the pushing load FL, the fixing force F, the assembling load Fs, and the coefficient of static friction of the samples, which are shown in FIG. 6, was examined. The value of the pushing-in distance L is to be 0 at the position where the elastic tube 34 is in contact with the gripping part 52. The fixing force F was defined as the minimum load (that is, the maximum fixing force) required for the molded body 50 moving through the through-hole 27 when the assembling load Fs is gradually increased. The fixing force F was obtained as follows. First, while the molded body 50 being floated by 2 mm from the abutment surface 26 of the gripping jig 20 for assembling, the slider 30 was moved by a predetermined push-up distance L so as to fix the molded body 50. Then, the attachment of Digital Force Gauge (made from IMADA CO, .LTD. type ZP-50N) was gradually pulled in the joining part of the fixed molded body 50 in the assembling direction, and the reading value of Digital Force Gauge when the molded body 50 moves through the through-hole 27 was defined as the fixing force F. The pushing load FL was obtained as follows. First, the gripping part 52 of the molded body 50 was fixed to the attachment of Digital Force Gauge with an adhesive so that the body of Digital Force Gauge does not move even when a load would be applied to the attachment. Then, the elastic tube 34 of the slider 30 was arranged so as to intersect and abut the gripping part 52 of the molded body 50 fixed with the adhesive to the attachment of Digital Force Gauge. Subsequently, using a single axis stage fixed immovably even a load would be applied, the elastic tube 34 was pushed in the gripping part 52 by the push-up distance L by pushing the slider 30 by the push-up distance L. The reading value of Digital Force Gauge at this time was defined as the pushing load FL corresponding to the push-up distance L. The results are shown in FIG. 9. The push-up distance L and the fixing force F increase in proportion to the push-up distance L. The coefficient of static friction obtained from the fixing force F=(the coefficient of static friction)×the pushing load FL exhibits roughly constant values. In addition, the fixing force F and the pushing load FL may also be measured by other stress measurement instruments, such as a compression tester and a load cell, or may use suitable values corresponding to shapes and the strength of the molded body 50.

What is claimed is:

1. A gripping jig for assembling a plurality of members for assembling, the gripping jig for assembling comprising:

a plurality of movement units, each movement unit guiding at least two members for assembling in a predetermined assembling direction;

a fixing-force applying unit for each of the plurality of movement units, the fixing-force applying unit fixing the members for assembling by applying a single fixing force to the at least two members along a common axis for assembling in a direction different from the assembling direction of the members for assembling; and an adjusting unit for adjusting the fixing force applied by the fixing-force applying unit so that the at least two members for assembling are guided by each movement unit to move in the assembling direction when a predetermined assembling load or more is applied to the members for assembling.

2. The gripping jig according to claim 1, further comprising an abutment unit for applying an assembling load to the members for assembling by abutting the members for assembling.

3. The gripping jig according to claim 1, wherein the fixing-force applying unit applies the fixing force to the members for assembling in a direction perpendicular to the assembling direction.

4. The gripping jig according to claim 1, wherein the fixing-force applying unit includes a pushing unit for pushing a part of the members for assembling, so as to apply the fixing force to the members for assembling, and a positioning unit for positioning the members for assembling pushed by the pushing unit in the assembling direction.

5. The gripping jig according to claim 4, wherein the pushing unit is formed of an elastic body.

6. The gripping jig according to claim 5, wherein the pushing unit is formed of a hollow member.

7. The gripping jig according to claim 4, wherein the fixing-force applying unit includes a sliding unit for moving the pushing unit toward the members for assembling, and the adjusting unit is an adjustment screw capable of adjusting the fixing force by changing the position of the sliding unit.

8. The gripping jig according to claim 6, wherein the fixing-force applying unit applies the fixing force to the members for assembling by pressurizing the inside of the pushing unit formed of the hollow member so as to inflate the pushing unit, and the adjusting unit adjusts the pressure to the pushing unit.

9. The gripping jig according to claim 1, wherein the fixing-force applying unit includes a pulling-in unit for attracting part of the members for assembling so as to apply the fixing force to the members for assembling and a positioning unit for positioning the members for assembling pulled by the pulling-in unit in the assembling direction.

10. The gripping jig according to claim 4, wherein the members for assembling include a gripping part which is gripped with the fixing-force applying unit and formed to have a gripping width within a predetermined parallel range, wherein each movement unit has a through-hole for guiding the gripping part to move in the assembling direction, and the positioning unit included in the fixing-force applying unit is formed on part of the inner wall of the through-hole.

11. The gripping jig according to claim 1, wherein the members for assembling are a brittle material made of a green ceramic raw material.

12. The gripping jig according to claim 1, wherein the members for assembling are any one of a luminous-tube molded body for a metal halide and a luminous-tube molded body for a high-pressure sodium vapor lamp, which are made of a green ceramic raw material.

13. An assembling device comprising:

a first mounting unit for mounting a first gripping jig for assembling according to claim 1, wherein a joining part of the at least two members for assembling fixed to the first gripping jig for assembling moves in a predetermined direction;

a second mounting unit for mounting a second gripping jig for assembling according to claim 1, wherein a joining part of the at least two members for assembling fixed to the second gripping jig for assembling is opposed to the joining part of the at least two members for assembling fixed to the first gripping jig for assembling; and a moving-assembling unit for guiding at least one of the first gripping jig for assembling and the second gripping jig for assembling so that the joining part of the at least two members of the first gripping jig for assembling mounted on the first mounting unit abuts the joining part of the at least two members of the second gripping jig for assembling mounted on the second mounting unit.

14. The assembling device according to claim 13, wherein the first mounting unit mounts the first gripping jig for assembling so that the joining part of the at least two members is upwardly directed in the vertical direction as the predetermined direction, and the second mounting unit mounts the second gripping jig for assembling so that the joining part of the at least two members is downwardly directed in the vertical direction, and wherein the moving-assembling unit guides the second gripping jig for assembling mounted on the second mounting unit toward the first gripping jig for assembling mounted on the first mounting unit.

* * * * *